(12) United States Patent
Takahashi (10) Patent No.: US 12,424,649 B2
(45) Date of Patent: Sep. 23, 2025

(54) FUEL CELL SYSTEM (71) Applicant: TOYOTA JIDOSHA KABUSHIKI KAISHA, Toyota (JP)

(72) Inventor: Yasushi Takahashi, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 498 days.

(21) Appl. No.: 18/162,749

(22) Filed: Feb. 1, 2023

(65) Prior Publication Data

US 2023/0253605 A1   Aug. 10, 2023

(30) Foreign Application Priority Data

Feb. 10, 2022   (JP) ................................. 2022-019266

(51) Int. Cl.
*H01M 8/2483* (2016.01)
*H01M 8/04119* (2016.01)
*H01M 8/04746* (2016.01)

(52) U.S. Cl.
CPC ..... *H01M 8/2483* (2016.02); *H01M 8/04126* (2013.01); *H01M 8/04746* (2013.01)

(58) Field of Classification Search
CPC ..... H01M 2008/1095; H01M 2250/20; H01M 8/04097; H01M 8/04126; H01M 8/04268; H01M 8/04302; H01M 8/0432; H01M 8/04373; H01M 8/04746; H01M 8/04753; H01M 8/2483; Y02E 60/50
See application file for complete search history.

(56) References Cited

FOREIGN PATENT DOCUMENTS

| JP | 2004273347 A | 9/2004 |
|---|---|---|
| JP | 2007134154 A | 5/2007 |
| JP | 2009176467 A | 8/2009 |

*Primary Examiner* — Victoria H Lynch
(74) *Attorney, Agent, or Firm* — Dickinson Wright, PLLC (57) ABSTRACT

A fuel cell system, wherein the fuel cell system comprises a fuel cell, an oxidant gas system and a controller; wherein the oxidant gas system comprises an oxidant gas supply flow path, an oxidant off-gas discharge flow path, a first bypass flow path, an oxidant gas supplier, a pressure control valve, a gas-liquid separator and a humidifier; wherein the oxidant gas supplier comprises, on the oxidant off-gas discharge flow path side, an expander connected to the oxidant gas supplier by an axis.

3 Claims, 3 Drawing Sheets

FUEL CELL SYSTEM

TECHNICAL FIELD

The disclosure relates to a fuel cell system.

BACKGROUND

A fuel cell system in which the oxidant gas system is equipped with several devices such as a humidifier, has been studied to improve the merchantability of fuel cell electric vehicles (hereinafter may be simply referred to as "vehicles") or the like.

For example, Patent Literature 1 discloses a technique of heating devices with a heater to prevent, at the time of activating the fuel cell system at sub-zero temperatures, liquid water generated in a fuel cell from being frozen in devices on the downstream side of the fuel cell.

As a technique that does not use a heater, Patent Literature 2 discloses a fuel cell system which can expeditiously discharge moisture in an equipment arranged on a downstream side of a fuel cell during operation shutdown of the fuel cell.

Patent Literature 3 discloses a fuel cell system which can warm up a humidifier without supplying wet air to a fuel cell in a cooled state.

Patent Literature 1: Japanese Patent Application Laid-Open (JP-A) No. 2009-176467
Patent Literature 2: JP-A No. 2007-134154
Patent Literature 3: JP-A No. 2004-273347

At the time of activating a fuel cell system at sub-zero temperatures, water is generated in the fuel cell of the fuel cell system and discharged therefrom as liquid water. The generated water is problematic in that it loses heat and freezes in the devices that are disposed on the downstream side of the fuel cell in the oxidant gas system of the system, thereby clogging the flow path of the oxidant gas system. Also, the generated water is problematic in that the water is formed into ice particles, and the particles hit and break the devices that are disposed on the downstream side of the fuel cell in the oxidant gas system.

Like the technique of Patent Literature 1, when the fuel cell system is equipped with a heater, there is a possibility that the fuel cell system grows in size and cannot be mounted on vehicles.

SUMMARY

The present disclosure was achieved in light of the above circumstances. An object of the present disclosure is to provide a fuel cell system configured to suppress the freezing of the generated water discharged from the fuel cell of the fuel cell system, without the use of a heater.

In a first embodiment, there is provided a fuel cell system,
wherein the fuel cell system comprises a fuel cell, an oxidant gas system and a controller;
wherein the oxidant gas system comprises an oxidant gas supply flow path, an oxidant off-gas discharge flow path, a first bypass flow path, an oxidant gas supplier, a pressure control valve, a gas-liquid separator and a humidifier;
wherein the humidifier is disposed across the oxidant gas supply flow path and the oxidant off-gas discharge flow path;
wherein the oxidant gas supply flow path connects a cathode inlet of the fuel cell and the outside of the fuel cell system;
wherein the oxidant gas supplier and the humidifier are disposed in this order from upstream in the oxidant gas supply flow path;
wherein the oxidant off-gas discharge flow path connects a cathode outlet of the fuel cell and the outside of the fuel cell system;
wherein the pressure control valve, the gas-liquid separator and the humidifier are disposed in this order from upstream in the oxidant off-gas discharge flow path;
wherein the first bypass flow path branches from the oxidant gas supply flow path at a first branch downstream of the oxidant gas supplier of the oxidant gas supply flow path and upstream of the humidifier thereof, bypasses the fuel cell, and then merges into the oxidant off-gas discharge flow path at a first junction downstream of the pressure control valve of the oxidant off-gas discharge flow path and upstream of the gas-liquid separator thereof;
wherein a first bypass valve is disposed in the first bypass flow path;
wherein the oxidant gas supplier comprises, on the oxidant off-gas discharge flow path side, an expander connected to the oxidant gas supplier by an axis;
wherein the oxidant gas supplier recovers at least one of the oxidant gas, of which temperature has been increased by compression with the expander in the oxidant gas supplier, and the oxidant off-gas and uses the recovered gas as a regenerative energy;
wherein the expander is disposed downstream from the humidifier in the oxidant off-gas discharge flow path; and
wherein, at a time of activating the fuel cell system at sub-zero temperatures, the controller opens the first bypass valve to supply a part of the oxidant gas, of which temperature has been increased by compression in the oxidant gas supplier, to the oxidant off-gas discharge flow path via the first bypass flow path.

In the fuel cell system,
the controller may preliminarily store a data group showing a relationship between an outside temperature, a temperature of the expander, and a pressure ratio, which is required to warm up the expander, of the oxidant gas discharged from the oxidant gas supplier to the oxidant gas supplied to the oxidant gas supplier;
at a time of activating the fuel cell system at sub-zero temperatures, the controller may check the outside temperature and the temperature of the expander with the data group and calculate a target pressure ratio, which is required to warm up the expander, of the oxidant gas discharged from the oxidant gas supplier to the oxidant gas supplied to the oxidant gas supplier; and
the controller may control an opening degree of the pressure control valve and an opening degree of the first bypass valve to set the pressure ratio of the oxidant gas discharged from the oxidant gas supplier to the oxidant gas supplied to the oxidant gas supplier, to the target pressure ratio.

Also in the fuel cell system,
the oxidant gas system may comprise a second bypass flow path;
the second bypass flow path may branch from the oxidant gas supply flow path at a second branch downstream of the oxidant gas supplier of the oxidant gas supply flow path and upstream of the humidifier thereof, may bypass the humidifier, and then may merge into the oxidant gas supply flow path at a second junction downstream of the humidifier of the oxidant gas supply flow path; and a second bypass valve configured to switch a flow of the oxidant gas to the oxidant gas supply flow path or the second bypass flow path, may be disposed in the second bypass flow path.

According to the fuel cell system of the present disclosure, the freezing of the generated water discharged from the fuel cell of the fuel cell system, is suppressed without the use of a heater.

BRIEF DESCRIPTION OF THE DRAWINGS

In the accompanying drawings.

DETAILED DESCRIPTION

Hereinafter, the embodiments of the present disclosure will be described in detail. Matters that are required to implement the present disclosure (such as common fuel cell structures and production processes not characterizing the present disclosure) other than those specifically referred to in the Specification, may be understood as design matters for a person skilled in the art based on conventional techniques in the art. The present disclosure can be implemented based on the contents disclosed in the Specification and common technical knowledge in the art.

In the Specification, "–" used to indicate a numerical range, is used to mean that the range includes the numerical values described before and after "–" as the lower and the upper limit values.

Also in the Specification, the upper and lower limit values of the numerical range may be a desired combination.

The fuel cell system of the present disclosure is a fuel cell system, wherein the fuel cell system comprises a fuel cell, an oxidant gas system and a controller;

wherein the oxidant gas system comprises an oxidant gas supply flow path, an oxidant off-gas discharge flow path, a first bypass flow path, an oxidant gas supplier, a pressure control valve, a gas-liquid separator and a humidifier;

wherein the humidifier is disposed across the oxidant gas supply flow path and the oxidant off-gas discharge flow path;

wherein the oxidant gas supply flow path connects a cathode inlet of the fuel cell and the outside of the fuel cell system;

wherein the oxidant gas supplier and the humidifier are disposed in this order from upstream in the oxidant gas supply flow path;

wherein the oxidant off-gas discharge flow path connects a cathode outlet of the fuel cell and the outside of the fuel cell system;

wherein the pressure control valve, the gas-liquid separator and the humidifier are disposed in this order from upstream in the oxidant off-gas discharge flow path;

wherein the first bypass flow path branches from the oxidant gas supply flow path at a first branch downstream of the oxidant gas supplier of the oxidant gas supply flow path and upstream of the humidifier thereof, bypasses the fuel cell, and then merges into the oxidant off-gas discharge flow path at a first junction downstream of the pressure control valve of the oxidant off-gas discharge flow path and upstream of the gas-liquid separator thereof;

wherein a first bypass valve is disposed in the first bypass flow path;

wherein the oxidant gas supplier comprises, on the oxidant off-gas discharge flow path side, an expander connected to the oxidant gas supplier by an axis;

wherein the oxidant gas supplier recovers at least one of the oxidant gas, of which temperature has been increased by compression with the expander in the oxidant gas supplier, and the oxidant off-gas and uses the recovered gas as a regenerative energy;

wherein the expander is disposed downstream from the humidifier in the oxidant off-gas discharge flow path; and wherein, at a time of activating the fuel cell system at sub-zero temperatures, the controller opens the first bypass valve to supply a part of the oxidant gas, of which temperature has been increased by compression in the oxidant gas supplier, to the oxidant off-gas discharge flow path via the first bypass flow path.

According to the fuel cell system of the present disclosure, a part of the oxidant gas, of which temperature has been increased by compression in the oxidant gas supplier, joins the downstream of the pressure control valve of the oxidant off-gas discharge flow path and the upstream of the gas-liquid separator thereof, via the first bypass flow path. Accordingly, the fuel cell and the devices of the oxidant off-gas discharge flow path (hereinafter, they may be referred to as "gas discharge devices") are warmed up; the gas discharge devices of the oxidant off-gas discharge flow path are warmed up without a heater; and the freezing of the generated water discharged from the fuel cell, is suppressed. According to the fuel cell system of the present disclosure, by appropriately selecting the pressure ratio of the oxidant gas which is compressed in the oxidant gas supplier with reference to the outside temperature and the expander temperature, and by controlling the opening degree of the pressure control valve and that of the first bypass valve, the fuel cell and the gas discharge devices of the oxidant off-gas discharge flow path are efficiently warmed up, and the freezing of the generated water in the oxidant off-gas discharge flow path, is efficiently suppressed.

Figure 1:
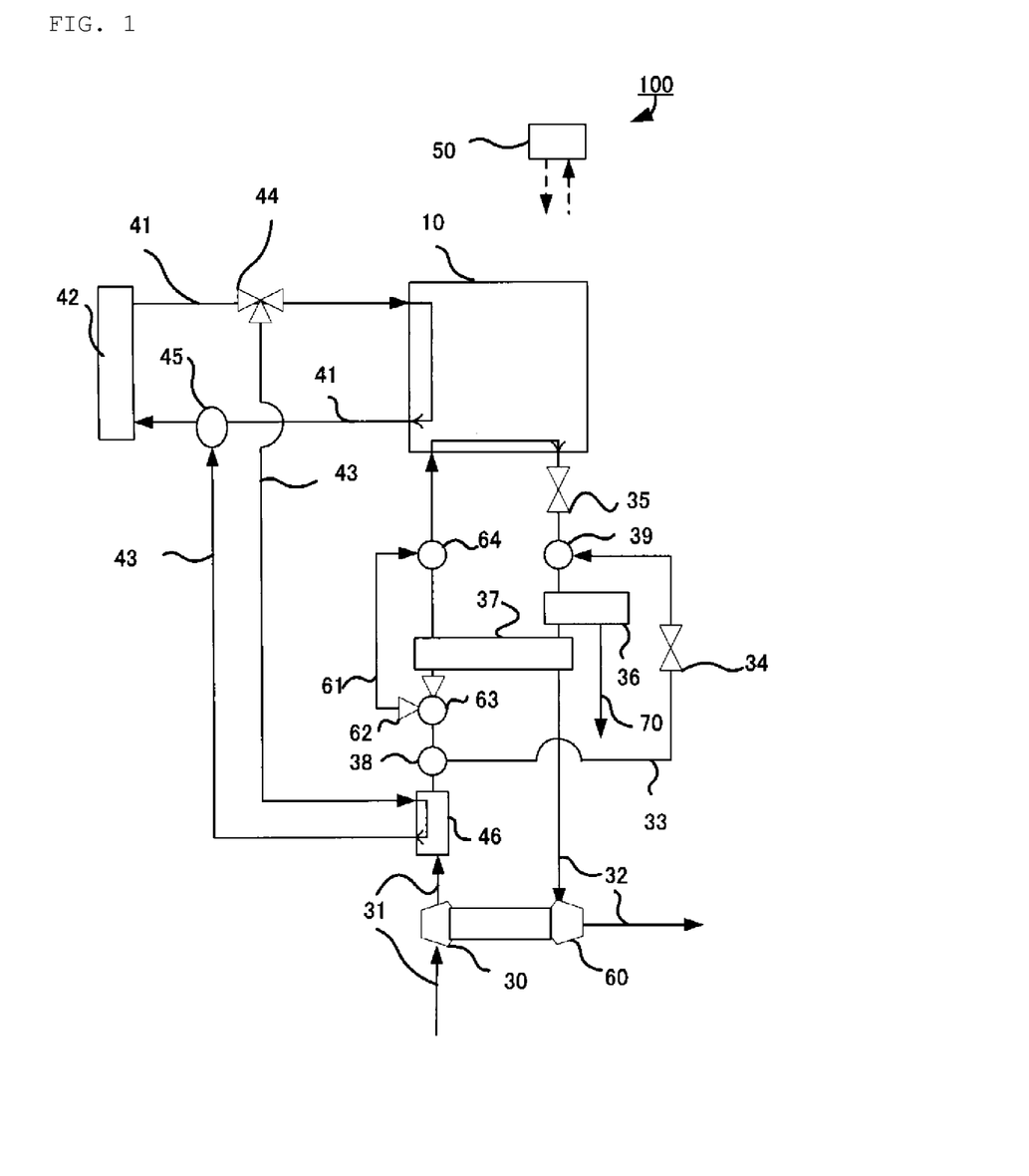
FIG. 1 is a schematic configuration diagram of an example of the fuel cell system of the present disclosure.

FIG. 1 is a schematic configuration diagram of an example of the fuel cell system of the present disclosure.

A fuel cell system 100 shown in FIG. 1 includes a fuel cell 10 and a controller 50.

As an oxidant gas system, the fuel cell system 100 includes an oxidant gas supplier 30, an oxidant gas supply flow path 31, an oxidant off-gas discharge flow path 32, a first bypass flow path 33, a first bypass valve 34, a pressure control valve 35, a gas-liquid separator 36, a humidifier 37, a first branch 38, a first junction 39, an expander 60, a second bypass flow path 61, a second bypass valve 62, a second branch 63, a second junction 64 and an intercooler 46. A water discharge flow path 70 for discharging separated liquid water, is connected to the gas-liquid separator 36.

As a cooling system, the fuel cell system 100 includes a refrigerant flow path 41, a radiator 42, a refrigerant bypass flow path 43, a three-way valve 44 for a refrigerant and a refrigerant flow path junction 45.

For simplicity, a fuel gas system is not illustrated in FIG. 1.

The fuel cell system of the present disclosure includes the fuel cell, the oxidant gas system and the controller.

In general, the fuel cell system of the present disclosure is mounted and used in a vehicle including a motor as a driving source.

The fuel cell system of the present disclosure may be mounted and used in a vehicle that can be run by the power of a secondary cell.

The vehicle may be a fuel cell electric vehicle.

The vehicle may include the fuel cell system of the present disclosure.

The motor is not particularly limited, and it may be a conventionally-known driving motor.

The fuel cell system of the present disclosure includes the fuel cell.

The fuel cell may be a fuel cell composed of only one unit fuel cell, or it may be a fuel cell stack composed of stacked unit fuel cells. The single unit fuel cell and the fuel cell stack composed of stacked unit cells may be referred to as "fuel cell".

The number of the stacked unit fuel cells is not particularly limited. For example, 2 to several hundred unit fuel cells may be stacked.

Each unit fuel cell includes at least the electrolyte membrane. In general, it includes a membrane electrode gas diffusion layer assembly.

The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes the cathode catalyst layer and the cathode-side gas diffusion layer.

The anode (fuel electrode) includes the anode catalyst layer and the anode-side gas diffusion layer.

The cathode catalyst layer and the anode catalyst layer are collectively referred to as "catalyst layer".

The catalyst layer may contain a catalyst metal for accelerating an electrochemical reaction, a proton-conducting electrolyte, and an electron-conducting carrier, for example.

As the catalyst metal, for example, platinum (Pt) or an alloy of Pt and another metal (such as Pt alloy mixed with cobalt, nickel or the like) may be used.

The electrolyte may be fluorine resin or the like. As the fluorine resin, for example, a Nafion solution may be used.

The catalyst metal is supported on the carrier. In each catalyst layer, the carrier supporting the catalyst metal (i.e., catalyst supporting carrier) and the electrolyte may be mixed.

As the carrier for supporting the catalyst metal, examples include, but are not limited to, a commercially-available carbonaceous material such as carbon.

The cathode-side gas diffusion layer and the anode-side gas diffusion layer are collectively referred to as "gas diffusion layer".

The gas diffusion layer may be a gas-permeable electro-conductive member or the like.

As the electroconductive member, examples include, but are not limited to, a porous carbon material such as carbon cloth and carbon paper, and a porous metal material such as metal mesh and foam metal.

The electrolyte membrane may be a solid polymer electrolyte membrane. As the solid polymer electrolyte membrane, examples include, but are not limited to, a hydrocarbon electrolyte membrane and a fluorine electrolyte membrane such as a thin, moisture-containing perfluorosulfonic acid membrane. The electrolyte membrane may be a Nafion membrane (manufactured by DuPont Co., Ltd.), for example.

As needed, each unit fuel cell may include two separators sandwiching both sides of the membrane electrode gas diffusion layer assembly. One of the two separators is an anode-side separator, and the other is a cathode-side separator. In the present disclosure, the anode-side separator and the cathode-side separator are collectively referred to as "separator".

The separator may include supply and discharge holes for allowing a fluid such as a reaction gas and a refrigerant to flow in the stacking direction of the unit fuel cells. As the refrigerant, for example, a mixed solution of ethylene glycol and water may be used to prevent freezing at low temperature.

As the supply hole, examples include, but are not limited to, a fuel gas supply hole, an oxidant gas supply hole, and a refrigerant supply hole.

As the discharge hole, examples include, but are not limited to, a fuel gas discharge hole, an oxidant gas discharge hole, and a refrigerant discharge hole.

The separator may include a reaction gas flow path on a surface in contact with the gas diffusion layer. Also, the separator may include a refrigerant flow path for keeping the temperature of the fuel cell constant, on the surface opposite to the surface in contact with the gas diffusion layer.

The separator may be a gas-impermeable electroconductive member or the like. As the electroconductive member, examples include, but are not limited to, a resin material such as thermosetting resin, thermoplastic resin and resin fiber, gas-impermeable dense carbon obtained by compressing a carbonaceous material such as carbon powder and carbon fiber, and a metal plate (such as an iron plate, an aluminum plate and a stainless-steel plate) obtained by press-molding. The separator may function as a collector.

The shape of the separator may be a rectangular shape, a horizontal hexagon shape, a horizontal octagon shape, a circular shape or a long circular shape, for example.

The separator may include a gas divider. The gas divider is disposed in a region between the reaction gas manifold and the reaction gas flow path, and it spreads and unspreads a gas flow from the reaction gas manifold to the power generation region. On the reaction gas inlet side, the gas divider has the structure of spreading the gas flow. On the reaction gas outlet side, the gas divider has the structure of unspreading the gas flow.

The fuel cell stack may include a manifold such as an inlet manifold formed by connected supply holes and an outlet manifold formed by connected discharge holes.

As the inlet manifold, examples include, but are not limited to, an anode inlet manifold, a cathode inlet manifold and a refrigerant inlet manifold.

As the outlet manifold, examples include, but are not limited to, an anode outlet manifold, a cathode outlet manifold and a refrigerant outlet manifold.

In the present disclosure, the fuel gas and the oxidant gas are collectively referred to as "reaction gas". The reaction gas supplied to the anode is the fuel gas, and the reaction gas supplied to the cathode is the oxidant gas. The fuel gas is a gas mainly containing hydrogen, and it may be hydrogen.

The oxidant gas is a gas containing oxygen, and it may be oxygen, air, dry air or the like.

The fuel cell system includes the oxidant gas system.

The oxidant gas system includes the oxidant gas supply flow path, the oxidant off-gas discharge flow path, the first bypass flow path, the first bypass valve, the oxidant gas supplier, the pressure control valve, the gas-liquid separator and the humidifier. As needed, the oxidant gas system may include the second bypass flow path, the second bypass valve and so on.

The oxidant gas supply flow path connects the cathode inlet of the fuel cell and the outside of the fuel cell system. The oxidant gas supply flow path allows the oxidant gas to be supplied to the cathode of the fuel cell. The cathode inlet may be an oxidant gas supply hole, a cathode inlet manifold or the like.

The oxidant gas supplier and the humidifier are disposed in this order from upstream in the oxidant gas supply flow path.

The oxidant gas supplier includes, on the oxidant off-gas discharge flow path side, the expander connected to the oxidant gas supplier by the axis.

The oxidant gas supplier recovers at least one of the oxidant gas, of which temperature has been increased by compression with the expander in the oxidant gas supplier, and the oxidant off-gas and uses the recovered gas as the regenerative energy.

The expander is disposed downstream from the humidifier in the oxidant off-gas discharge flow path.

The oxidant gas supplier is not particularly limited, as long as it can compress and discharge the oxidant gas supplied from the outside. The oxidant gas supplier may be an air compressor or the like. The oxidant gas supplier is electrically connected to the controller. The controller controls the activation of the oxidant gas supplier.

The oxidant off-gas discharge flow path connects the cathode outlet of the fuel cell and the outside of the fuel cell system. The oxidant off-gas discharge flow path allows the oxidant off-gas, which is the oxidant gas discharged from the cathode of the fuel cell, to be discharged to the outside of the fuel cell system. The cathode outlet may be the oxidant gas discharge hole, the cathode outlet manifold, or the like.

The pressure control valve, the gas-liquid separator and the humidifier are disposed in this order from upstream in the oxidant off-gas discharge flow path.

The pressure control valve is electrically connected to the controller. By opening the pressure control valve by the controller, the oxidant off-gas, which is the reacted oxidant gas, is discharged to the outside of the fuel cell system from the oxidant off-gas discharge flow path. The pressure of the oxidant gas supplied to the cathode (cathode pressure) may be controlled by controlling the opening degree of the pressure control valve. The components of the oxidant off-gas may be the same as the components of the oxidant gas. It may be oxygen, air, dry air or the like, and it may contain water vapor or the like.

The first bypass flow path branches from the oxidant gas supply flow path at the first branch downstream of the oxidant gas supplier of the oxidant gas supply flow path and upstream of the humidifier thereof, bypasses the fuel cell, and then merges into the oxidant off-gas discharge flow path at the first junction downstream of the pressure control valve of the oxidant off-gas discharge flow path and upstream of the gas-liquid separator thereof.

The first bypass valve is disposed in the first bypass flow path. The first bypass valve may be a valve that its opening degree is controllable, and it may be a three-way valve for the oxidant gas. When the first bypass valve is the three-way valve for the oxidant gas, it may be disposed at the first branch most upstream of the first bypass flow path.

The first bypass valve is electrically connected to the controller. By opening the first bypass valve by the controller, a part of the oxidant gas, of which temperature has been increased by compression in the oxidant gas supplier, can bypass the fuel cell and be supplied to the oxidant off-gas discharge flow path when, for example, the fuel cell and the gas discharge devices such as the expander of the oxidant off-gas discharge flow path are warmed up at the time of activating the fuel cell system at sub-zero temperatures. When the first bypass valve is the three-way valve for the oxidant gas and when, for example, the supply of the oxidant gas to the fuel cell is not required, the whole oxidant gas can be supplied to the oxidant off-gas discharge flow path by changing the oxidant gas flow from the oxidant gas supply flow path to the first bypass flow path by closing the oxidant gas supply flow path downstream-side valve of the first bypass valve and opening the first bypass flow path-side valve thereof by the controller.

The humidifier is disposed across the oxidant gas supply flow path and the oxidant off-gas discharge flow path.

The humidifier may include a water permeable membrane, for example. By disposing the water permeable membrane in a region between the oxidant gas supply flow path and the oxidant off-gas discharge flow path to deliver the oxidant gas and the oxidant off-gas into the humidifier, the water contained in the oxidant off-gas passes through the water permeable membrane, moves to the oxidant gas and humidifies the oxidant gas, accordingly.

For example, from the viewpoint of suppressing the excessive humidification of the fuel cell at the time of activating the fuel cell system at sub-zero temperatures and from the viewpoint of suppressing the flow of the generated water into the oxidant off-gas discharge flow path, the oxidant gas system may include the second bypass flow path bypassing the humidifier.

The second bypass flow path branches from the oxidant gas supply flow path at the second branch downstream of the oxidant gas supplier of the oxidant gas supply flow path and upstream of the humidifier thereof, bypasses the humidifier, and then merges into the oxidant gas supply flow path at the second junction downstream of the humidifier of the oxidant gas supply flow path.

When the oxidant gas system includes a cooler, the second bypass flow path may bypass only the humidifier, or it may also bypass the cooler.

The second bypass valve configured to switch the flow of the oxidant gas to the oxidant gas supply flow path or the second bypass flow path, is disposed in the second bypass flow path. The second bypass valve may be a second three-way valve for the oxidant gas. When the second bypass valve is the second three-way valve for the oxidant gas, it may be disposed at the second branch most upstream of the second bypass flow path.

The second bypass valve is electrically connected to the controller. The oxidant gas can bypass the humidifier and be supplied to the fuel cell by changing the flow of the oxidant gas from the oxidant gas supply flow path to the second bypass flow path by closing the oxidant gas supply flow path downstream-side valve of the second bypass valve and opening the second bypass flow path-side valve thereof by the controller.

The oxidant gas system may include a cooler (intercooler) downstream of the oxidant gas supplier of the oxidant gas supply flow path and upstream of the humidifier thereof. The cooler may be disposed downstream of the oxidant gas supplier of the oxidant gas supply flow path and upstream of the first branch to the first bypass flow path.

The cooler may be a cooler configured to fulfill a cooling function by circulating the refrigerant of the cooling system in and out of the cooler.

The fuel cell system may include a fuel gas system.

The fuel gas system supplies fuel gas to the fuel cell.

The fuel gas system may include a fuel gas supplier, a fuel gas supply flow path, a fuel off-gas discharge flow path, a fuel gas bypass flow path, and so on.

The fuel gas supplier supplies the fuel gas to the anode of the fuel cell.

As the fuel gas supplier, examples include, but are not limited to, a fuel tank such as a liquid hydrogen tank and a compressed hydrogen tank.

The fuel gas supplier is electrically connected to the controller. In the fuel gas supplier, ON/OFF of the fuel gas supply to the fuel cell may be controlled by controlling the opening and closing of the main shutoff valve of the fuel gas supplier according to a control signal from the controller.

The fuel gas supply flow path connects the fuel gas supplier and the anode inlet of the fuel cell. The fuel gas supply flow path allows the fuel gas containing hydrogen to be supplied to the anode of the fuel cell. The anode inlet may be a fuel gas supply hole, an anode inlet manifold, or the like.

The fuel off-gas discharge flow path connects the anode outlet of the fuel cell and the outside of the fuel cell system. The fuel off-gas discharge flow path may merge into the oxidant off-gas discharge flow path in a region downstream from the expander of the oxidant off-gas discharge flow path. The anode outlet may be a fuel gas discharge hole, an anode outlet manifold, or the like.

The fuel off-gas may contain the fuel gas that has passed through the anode without reacting, and the water generated in the cathode and delivered to the anode. In some cases, the fuel off-gas contains corroded substances generated in the catalyst layer, the electrolyte membrane or the like, and the oxidant gas or the like allowed to be supplied to the anode during a purge.

The fuel cell system may include the cooling system.

The cooling system controls the temperature of the fuel cell.

The cooling system includes the refrigerant flow path. As needed, the cooling system may include a refrigerant bypass flow path, a three-way valve for the refrigerant and so on.

The refrigerant flow path allows the refrigerant to circulate in and out of the fuel cell. The refrigerant flow path connects to a refrigerant supply hole and a refrigerant discharge hole, which are holes provided in the fuel cell, and it allows the refrigerant to circulate in and out of the fuel cell.

The refrigerant flow path may be provided with a refrigerant supplier. The refrigerant supplier is electrically connected to the controller. The refrigerant supplier is activated according to a control signal from the controller. The controller controls the flow rate of the refrigerant supplied from the refrigerant supplier to the fuel cell. Accordingly, the temperature of the fuel cell is controlled. As the refrigerant supplier, examples include, but are not limited to, a cooling water pump.

The refrigerant flow path may be provided with a radiator for heat dissipation from the cooling water.

The refrigerant flow path may be provided with a reserve tank for storing the refrigerant.

The refrigerant bypass flow path branches from the refrigerant flow path via the three-way valve for the refrigerant, bypasses the fuel cell, connects to the intercooler, and then merges into the refrigerant flow path at a refrigerant flow path junction downstream of the refrigerant flow path. The refrigerant bypass flow path allows the refrigerant to circulate in and out of the intercooler.

The three-way valve for the refrigerant allows the control of the refrigerant supply from the refrigerant flow path to the refrigerant bypass flow path. The three-way valve for the refrigerant is electrically connected to the controller. The controller controls the opening and closing of the three-way valve for the refrigerant.

The fuel cell system may include a battery.

The battery (a secondary cell) may be any chargeable and dischargeable battery. For example, it may be a conventionally-known secondary cell such as a nickel-hydrogen secondary cell and a lithium ion secondary cell. The secondary cell may include a power storage element such as an electric double layer capacitor. The secondary cell may have a structure such that a plurality of secondary cells are connected in series. The secondary cell supplies power to the air compressor and the like. The secondary cell may be chargeable by a power source outside the vehicle, such as a household power supply. The secondary cell may be charged by the output power of the fuel cell. The charge and discharge of the secondary cell may be controlled by the controller.

The controller physically includes a processing unit such as a central processing unit (CPU), a memory device such as a read-only memory (ROM) and a random access memory (RAM), and an input-output interface. The ROM is used to store a control program, control data and so on to be processed by the CPU, and the RAM is mainly used as various workspaces for control processing. The controller may be a control device such as an electronic control unit (ECU).

The controller may be electrically connected to an ignition switch which may be mounted in the vehicle. The controller may be operable by an external power source even if the ignition switch is turned OFF.

At the time of activating the fuel cell system at sub-zero temperatures, the controller opens the first bypass valve to supply a part of the oxidant gas, of which temperature has been increased by compression in the oxidant gas supplier, to the oxidant off-gas discharge flow path via the first bypass flow path. By dividing a part of the oxidant gas, of which temperature has been increased by compression in the oxidant gas supplier, from the oxidant gas supply flow path and supplying the divided oxidant gas to the oxidant off-gas discharge flow path, the fuel cell and the devices of the oxidant off-gas discharge flow path are warmed up; the devices of the oxidant off-gas discharge flow path are warmed up without a heater; and the freezing of the generated water discharged from the fuel cell, is suppressed.

When the oxidant gas system includes the second bypass flow path, at the time of activating the fuel cell system at sub-zero temperatures, the controller may open the first bypass valve to supply a part of the oxidant gas, of which temperature has been increased by compression in the oxidant gas supplier, to the first bypass flow path, may close the oxidant gas supply flow path downstream-side valve of the second bypass valve, and may open the second bypass flow path-side valve of the second bypass valve. Accordingly, the excessive humidification of the fuel cell is suppressed; the amount of the generated water discharged from the fuel cell, is reduced; and the freezing of the generated water is more suppressed.

In the present disclosure, the time of activating the fuel cell system at sub-zero temperatures, may be the time satisfying the condition that the outside temperature is 0° C. or less, the time satisfying the condition that the outside temperature is 0° C. or less and/or the temperature of the expander is 0° C. or less, or the time satisfying the condition that the outside temperature is 0° C. or less and/or the temperatures of the gas discharge devices are 0° C. or less.

The controller may preliminarily store the data group showing the relationship between the outside temperature, the temperature of the expander, and the pressure ratio, which is required to warm up the expander, of the oxidant gas discharged from the oxidant gas supplier to the oxidant gas supplied to the oxidant gas supplier.

The data group may be a data group showing the relationship between the outside temperature, the temperature of the gas-liquid separator, the temperature of the humidifier, the temperature of the expander, and the pressure ratio, which is required to warm up the expander, of the oxidant gas discharged from the oxidant gas supplier to the oxidant gas supplied to the oxidant gas supplier.

At the time of activating the fuel cell system at sub-zero temperatures, the controller may check the outside temperature and the temperature of the expander with the data group and calculate the target pressure ratio, which is required to warm up the expander, of the oxidant gas discharged from the oxidant gas supplier to the oxidant gas supplied to the oxidant gas supplier.

At the time of activating the fuel cell system at sub-zero temperatures, the controller may check the outside temperature, the temperature of the gas-liquid separator, the temperature of the humidifier, and the temperature of the expander with the data group and calculate the target pressure ratio, which is required to warm up the expander, of the oxidant gas discharged from the oxidant gas supplier to the oxidant gas supplied to the oxidant gas supplier.

Figure 2:
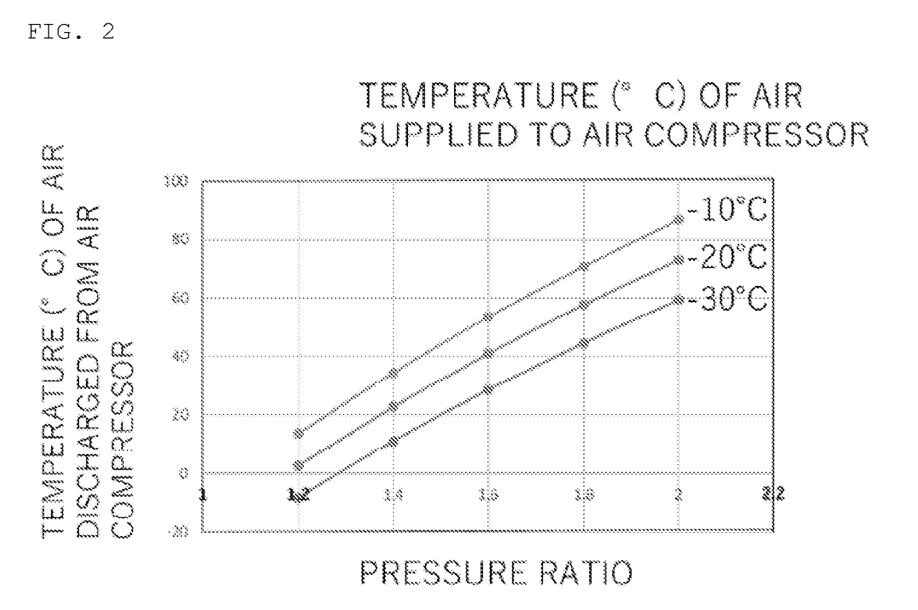
FIG. 2 is a graph showing an example of the relationship between, when the temperature of air supplied to an air compressor is −10° C., −20° C. and −30° C., the pressure ratio of the air discharged from the air compressor to the air supplied to the air compressor, and the temperature of the air discharged from the air compressor.

FIG. 2 is a graph showing an example of the relationship between, when the temperature of the air supplied to the air compressor is −10° C., −20° C. and −30° C., the pressure ratio of the air discharged from the air compressor to the air supplied to the air compressor, and the temperature of the air discharged from the air compressor.

As shown in FIG. 2, even at any pressure ratio, the temperature of the air discharged from the air compressor varies depending on the temperature of the air supplied to the air compressor.

Accordingly, the target pressure ratio which is required to warm up the expander, may be appropriately calculated depending on the temperature of the air supplied to the air compressor (i.e., the outside temperature) and the temperature of the expander.

The controller may control the opening degree of the pressure control valve and the opening degree of the first bypass valve to set the pressure ratio of the oxidant gas discharged from the oxidant gas supplier to the oxidant gas supplied to the oxidant gas supplier, to the target pressure ratio. Accordingly, the gas discharge devices of the oxidant off-gas discharge flow path are efficiently warmed up, and the freezing of the generated water in the oxidant off-gas discharge flow path, is efficiently suppressed.

The fuel cell system may include a temperature acquirer.

The temperature acquirer may acquire the outside temperature, the temperature of the expander, and the like. As needed, it may acquire the temperature of the gas-liquid separator, the temperature of the humidifier, and the like.

An air cleaner provided with a thermometer, such as a filter, may be disposed at the air supply hole of the oxidant gas supply flow path, and the outside temperature may be measured by the thermometer.

Since the expander expands oxidant-based gas, the temperature around the outlet of the expander decreases and is lower than the temperatures of other devices. Accordingly, the target pressure ratio of the oxidant gas, which is required to warm up the expander, can be estimated by measuring at least the temperature of the expander. The oxidant-based gas means at least one of the oxidant gas and the oxidant off-gas.

The temperature acquirer is electrically connected to the controller. The controller detects the temperatures acquired by the temperature acquirer, such as the outside temperature, the temperature of the gas-liquid separator, the temperature of the humidifier, and the temperature of the expander. As the temperature acquirer, a conventionally-known temperature sensor, a thermometer or the like may be used.

Figure 3:
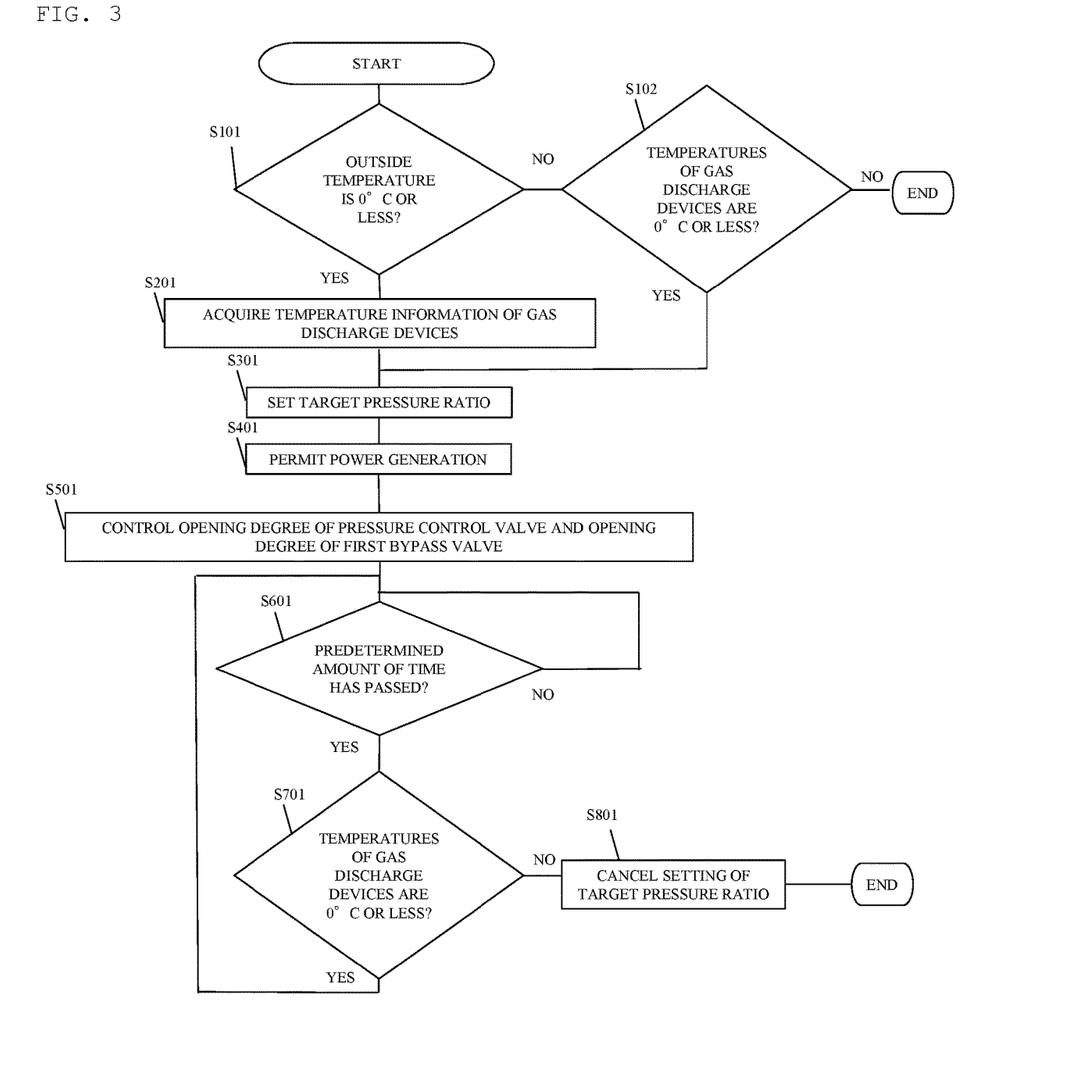
FIG. 3 is a flowchart of an example of control performed by the controller of the fuel cell system of the present disclosure.

FIG. 3 is a flowchart of an example of control performed by the controller of the fuel cell system of the present disclosure.

In the case of the fuel cell system mounted on a vehicle, for example, when the ignition switch of the fuel cell system is turned on, the controller measures the outside temperature first and then judges whether or not the measured outside temperature is 0° C. or less (S101).

In S102, when the outside temperature is higher than 0° C. in S101, the controller judges whether or not the temperatures of the gas discharge devices are 0° C. or less. The gas discharge devices include at least the expander. As needed, the gas discharge devices include the gas-liquid separator, the humidifier and so on.

When the temperatures of the gas discharge devices are higher than 0° C. in S102, the controller ends the control.

In S201, when the outside temperature is 0° C. or less in S101, the controller acquires the temperature information of the gas discharge devices. In S301, the controller refers to the data group and sets the target pressure ratio of the air which is compressed by the air compressor used as the oxidant gas supplier. The air temperature required to warm up the gas discharge devices such as the expander, varies depending on the outside temperature and the temperatures of the gas discharge devices. Accordingly, the pressure ratio which is required to warm up the gas discharge devices such as the expander, may be set as the target pressure ratio.

In S301, when the temperatures of the gas discharge devices are 0° C. or less in S102, the controller refers to the data group and sets the target pressure ratio of the air which is compressed by the air compressor.

In S401, the controller permits power generation of the fuel cell.

In S501, the controller controls the opening degree of the pressure control valve and the opening degree of the first bypass valve to set the pressure ratio of the air which is compressed by the air compressor to the target pressure ratio. Also, the controller may determine the rotational frequency of the air compressor, based on the power generation amount required of the fuel cell.

In S601, the controller judges whether or not a predetermined amount of time has passed from the start of the control of the opening degree of the pressure control valve and the opening degree of the first bypass valve. The predetermined amount of time may be the time required to warm up the gas discharge devices, and it may be appropriately set.

In S701, after the predetermined amount of time has passed, the controller judges whether or not the temperatures of the gas discharge devices such as the expander are 0° C. or less. When the temperatures of the gas discharge devices are 0° C. or less, the controller judges again whether or not the predetermined amount of time has passed.

In S801, when the temperatures of the gas discharge devices are higher than 0° C., the controller cancels the setting of the target pressure ratio and ends the control.

REFERENCE SIGNS LIST

10. Fuel cell
30. Oxidant gas supplier
31. Oxidant gas supply flow path
32. Oxidant off-gas discharge flow path
33. First bypass flow path
34. First bypass valve
35. Pressure control valve
36. Gas-liquid separator
37. Humidifier
38. First branch
39. First junction
41. Refrigerant flow path
42. Radiator
43. Refrigerant bypass flow path
44. Three-way valve for refrigerant
45. Refrigerant flow path junction
46. Intercooler
50. Controller
60. Expander
61. Second bypass flow path
62. Second bypass valve
63. Second branch
64. Second junction
70. Water discharge flow path
100. Fuel cell system

The invention claimed is:

1. A fuel cell system,
wherein the fuel cell system comprises a fuel cell, an oxidant gas system and a controller;
wherein the oxidant gas system comprises an oxidant gas supply flow path, an oxidant off-gas discharge flow path, a first bypass flow path, an oxidant gas supplier, a pressure control valve, a gas-liquid separator and a humidifier;
wherein the humidifier is disposed across the oxidant gas supply flow path and the oxidant off-gas discharge flow path;
wherein the oxidant gas supply flow path connects a cathode inlet of the fuel cell and the outside of the fuel cell system;
wherein the oxidant gas supplier and the humidifier are disposed in this order from upstream in the oxidant gas supply flow path;
wherein the oxidant off-gas discharge flow path connects a cathode outlet of the fuel cell and the outside of the fuel cell system;
wherein the pressure control valve, the gas-liquid separator and the humidifier are disposed in this order from upstream in the oxidant off-gas discharge flow path;
wherein the first bypass flow path branches from the oxidant gas supply flow path at a first branch downstream of the oxidant gas supplier of the oxidant gas supply flow path and upstream of the humidifier thereof, bypasses the fuel cell, and then merges into the oxidant off-gas discharge flow path at a first junction downstream of the pressure control valve of the oxidant off-gas discharge flow path and upstream of the gas-liquid separator thereof;
wherein a first bypass valve is disposed in the first bypass flow path;
wherein the oxidant gas supplier comprises, on the oxidant off-gas discharge flow path side, an expander connected to the oxidant gas supplier by an axis;
wherein the oxidant gas supplier recovers at least one of the oxidant gas, of which temperature has been increased by compression with the expander in the oxidant gas supplier, and the oxidant off-gas and uses the recovered gas as a regenerative energy;
wherein the expander is disposed downstream from the humidifier in the oxidant off-gas discharge flow path; and
wherein, at a time of activating the fuel cell system at sub-zero temperatures, the controller opens the first bypass valve to supply a part of the oxidant gas, of which temperature has been increased by compression in the oxidant gas supplier, to the oxidant off-gas discharge flow path via the first bypass flow path.

2. The fuel cell system according to claim 1,
wherein the controller preliminarily stores a data group showing a relationship between an outside temperature, a temperature of the expander, and a pressure ratio, which is required to warm up the expander, of the oxidant gas discharged from the oxidant gas supplier to the oxidant gas supplied to the oxidant gas supplier;
wherein, at a time of activating the fuel cell system at sub-zero temperatures, the controller checks the outside temperature and the temperature of the expander with the data group and calculates a target pressure ratio, which is required to warm up the expander, of the oxidant gas discharged from the oxidant gas supplier to the oxidant gas supplied to the oxidant gas supplier; and
wherein the controller controls an opening degree of the pressure control valve and an opening degree of the first bypass valve to set the pressure ratio of the oxidant gas discharged from the oxidant gas supplier to the oxidant gas supplied to the oxidant gas supplier, to the target pressure ratio.

3. The fuel cell system according to claim 1,
wherein the oxidant gas system comprises a second bypass flow path;
wherein the second bypass flow path branches from the oxidant gas supply flow path at a second branch downstream of the oxidant gas supplier of the oxidant gas supply flow path and upstream of the humidifier thereof, bypasses the humidifier, and then merges into the oxidant gas supply flow path at a second junction downstream of the humidifier of the oxidant gas supply flow path; and
wherein a second bypass valve configured to switch a flow of the oxidant gas to the oxidant gas supply flow path or the second bypass flow path, is disposed in the second bypass flow path.

* * * * *